(12) United States Patent
Watanabe et al.

(10) Patent No.: US 12,162,397 B2
(45) Date of Patent: Dec. 10, 2024

(54) VEHICULAR LAMP FITTING AND RADAR STRUCTURE

(71) Applicants: Stanley Electric Co., Ltd., Tokyo (JP); Honda Motor Co., Ltd., Tokyo (JP)

(72) Inventors: Naoki Watanabe, Tokyo (JP); Atsushi Imori, London, OH (US); Yuichiro Nishimura, Tokyo (JP); Minoru Yamaguchi, Tokyo (JP); Miho Sasaki, Wako (JP); Hideaki Aizawa, Tokyo (JP); Masayuki Takayama, Wako (JP); Hironori Tamakawa, Tokyo (JP); Takato Watanabe, Tokyo (JP)

(73) Assignees: STANLEY ELECTRIC CO., LID., Tokyo (JP); HONDA MOTOR CO., LTD., Tokyo (JP)

( * ) Notice: Subject to any disclaimer, the term of this patent is extended or adjusted under 35 U.S.C. 154(b) by 434 days.

(21) Appl. No.: 17/516,737

(22) Filed: Nov. 2, 2021

(65) Prior Publication Data

US 2023/0139390 A1    May 4, 2023

(51) Int. Cl.
*B60Q 1/00* (2006.01)
*B60Q 1/04* (2006.01)
(Continued)

(52) U.S. Cl.
CPC ......... *B60Q 1/0023* (2013.01); *B60Q 1/0491* (2013.01); *G01S 7/027* (2021.05);
(Continued)

(58) Field of Classification Search
CPC ...... B60Q 1/0023; B60Q 1/0491; B60Q 1/00; G01S 7/027; G01S 13/931;
(Continued)

(56) References Cited

U.S. PATENT DOCUMENTS 10,144,424 B2 * 12/2018 Hara ................ G01S 13/931
11,708,955 B2 * 7/2023 Aizawa ............ G01S 17/88
342/70
(Continued)

FOREIGN PATENT DOCUMENTS

JP   2020-38181 A    3/2020
JP   2021091303 A  * 6/2021
WO  2021/024887 A1   2/2021

OTHER PUBLICATIONS

JP2021091303A_Description_20230928_1033.pdf—translation of JP2021091303A (Year: 2021).*

(Continued)

*Primary Examiner* — Olumide Ajibade Akonai
*Assistant Examiner* — Yonghong Li
(74) *Attorney, Agent, or Firm* — XSENSUS LLP

(57) ABSTRACT

A vehicular lamp fitting and the like capable of preventing (or suppressing) vibrations of a radar unit (and as a result, capable of preventing the detection area of the radar unit from being significantly changed) are provided. A vehicular lamp fitting includes: a lamp housing; an outer lens attached to the lamp housing, the outer lens including a recessed part and forming a first space between the outer lens and the lamp housing; a lamp unit disposed in the first space; a radar cover disposed while covering the recessed part, and forming a second space between the radar cover and the recessed part; a bracket disposed in the second space; a radar unit detachably fixed to the bracket; and a first fixing part fixing one end of the bracket to the outer lens; and a second fixing part fixing the other end of the bracket to the lamp housing.

9 Claims, 11 Drawing Sheets

INNER SIDE IN VEHICLE-WIDTH DIRECTION ←——————→ OUTER SIDE IN VEHICLE-WIDTH DIRECTION

(51) Int. Cl.
  *G01S 7/02* (2006.01)
  *G01S 13/931* (2020.01)
(52) U.S. Cl.
  CPC ... *G01S 13/931* (2013.01); *G01S 2013/93271* (2020.01); *G01S 2013/93277* (2020.01)
(58) Field of Classification Search
  CPC .......... G01S 2013/93277; G01S 2013/932771; G01S 7/02; B60R 11/00; H01Q 1/00; H01Q 9/00; H01Q 13/00; H01Q 21/00
  See application file for complete search history.

(56) References Cited

U.S. PATENT DOCUMENTS

| | | | |
|---|---|---|---|
| 2008/0180965 A1* | 7/2008 | Nakamura | G01S 7/027 362/507 |
| 2022/0268923 A1* | 8/2022 | Katsurada | B60Q 1/0023 |

OTHER PUBLICATIONS

European Search Report issued Mar. 23, 2023 in European Patent Application No. 22204167.5, 10 pages.

* cited by examiner

INNER SIDE IN VEHICLE-WIDTH DIRECTION ↔ OUTER SIDE IN VEHICLE-WIDTH DIRECTION

VEHICULAR LAMP FITTING AND RADAR STRUCTURE

BACKGROUND

The present disclosure relates to a vehicular lamp fitting and a radar structure, and in particular to a vehicular lamp fitting and a radar structure capable of preventing (or suppressing) vibrations of a radar unit (and as a result, capable of preventing the detection area of the radar unit from being significantly changed).

Japanese Unexamined Patent Application Publication No. 2020-38181 discloses a vehicular lamp fitting including a lamp housing, a radar unit (a radar apparatus) attached to a plate-like part extending downward from the lower part of the lamp housing, and a radar cover disposed in front of the radar unit (see, in particular, FIG. 2 of Japanese Unexamined Patent Application Publication No. 2020-38181). The radar unit is used for detecting an object by transmitting a high-frequency electromagnetic wave (e.g., millimeter wave) around a vehicle and receiving a reflected wave from the object existing within a transmission range of the electromagnetic wave.

SUMMARY

However, in the vehicular lamp fitting disclosed in Japanese Unexamined Patent Application Publication No. 2020-38181, the radar unit is attached to the plate-like part which extends downward from the lower part of the lamp housing in a cantilevered manner. As a result, there is a problem that, due to vibrations of the vehicle on which the vehicular lamp fitting is mounted (e.g., due to vibrations thereof during the traveling), the plate-like part extending in the cantilevered manner (and the radar unit attached to this plate-like part) widely vibrates while the base (the fixed part) of the plate-like part acts as the fulcrum, so that the detection area of the radar unit is significantly changed.

The present disclosure has been made in order to solve the above-described problem, and an object thereof is to provide a vehicular lamp fitting and a radar structure capable of preventing (or suppressing) vibrations of a radar unit (and as a result, capable of preventing the detection area of the radar unit from being significantly changed).

A vehicular lamp fitting according to an aspect includes: a lamp housing; an outer lens attached to the lamp housing, the outer lens comprising a recessed part and forming a first space between the outer lens and the lamp housing; a lamp unit disposed in the first space; a radar cover disposed in a state of covering the recessed part and forming a second space between the radar cover and the recessed part; a bracket disposed in the second space; a radar unit disposed in the second space in a state where the radar unit is detachably fixed to the bracket; and a first fixing part fixing one end of the bracket to the outer lens; and a second fixing part fixing the other end of the bracket to the lamp housing.

By the above-described configuration, it is possible to prevent (or suppress) vibrations of the radar unit (and as a result, to prevent the detection area of the radar unit from being significantly changed).

This is because the bracket to which the radar unit is fixed does not extend in the cantilevered manner, but one end of the bracket is fixed to the outer lens and the other end thereof is fixed to the lamp housing.

Further, there is another advantage that the effect of the heat (the heat generated by the lamp unit) on the radar unit can be reduced. This is because the radar unit is disposed in the second space (formed by the outer lens and the radar cover) in which the temperature is lower than that in the first space (formed by the lamp housing and the outer lens) where the temperature is raised due to the heat generated by the lamp unit.

Further, there is an advantage that maintenance can be easily performed when the radar unit fails. This is because each of the radar unit and the radar cover is detachably fixed to the bracket, so that the radar unit can be replaced by removing the radar cover from the bracket without removing the vehicular lamp fitting itself from the vehicle.

Further, in the above-described vehicular lamp fitting, the first fixing part may be provided on the outer lens, and may fix one end of the bracket to the outer lens in a state where one end of the bracket is sandwiched.

Further, in the above-described vehicular lamp fitting, the radar cover may be detachably fixed to the bracket.

Further, in the above-described vehicular lamp fitting, in one of the recessed part and the bracket, at least one positioning rib, which abuts against (i.e., is in contact with) the other of the recessed part and the bracket, may be provided.

Further, in the above-described vehicular lamp fitting, the positioning rib may be a positioning rib configured to maintain a gap between the radar cover and the recessed part uniform.

Further, in the above-described vehicular lamp fitting, the other end of the bracket may extend through at least one bending part so as to stride over the recessed part.

Further, in the above-described vehicular lamp fitting, the other end of the bracket may eventually extend toward the lamp housing, and the tip of the other end of the bracket may be fixed to the lamp housing by the second fixing part.

Further, in the above-described vehicular lamp fitting, a stepped part may be formed between the outer lens and a part of the radar cover located adjacent to the outer lens.

Further, in the above-described vehicular lamp fitting, an end of the radar cover adjacent to the outer lens may bend backward through a bending part and thereby be disposed behind the outer lens.

Further, in the above-described vehicular lamp fitting, the outer lens may be transparent to visible light, and the radar cover may be opaque to visible light.

A radar structure according to another aspect includes: a radar cover forming a space between the radar cover and the bracket in a state where the radar cover is detachably fixed to the bracket; and a radar unit that is disposed in the space in a state where the radar unit detachably fixed to the bracket.

According to the present disclosure, it is possible to provide a vehicular lamp fitting and a radar structure capable of preventing (or suppressing) vibrations of a radar unit (and as a result, capable of preventing the detection area of the radar unit from being significantly changed).

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
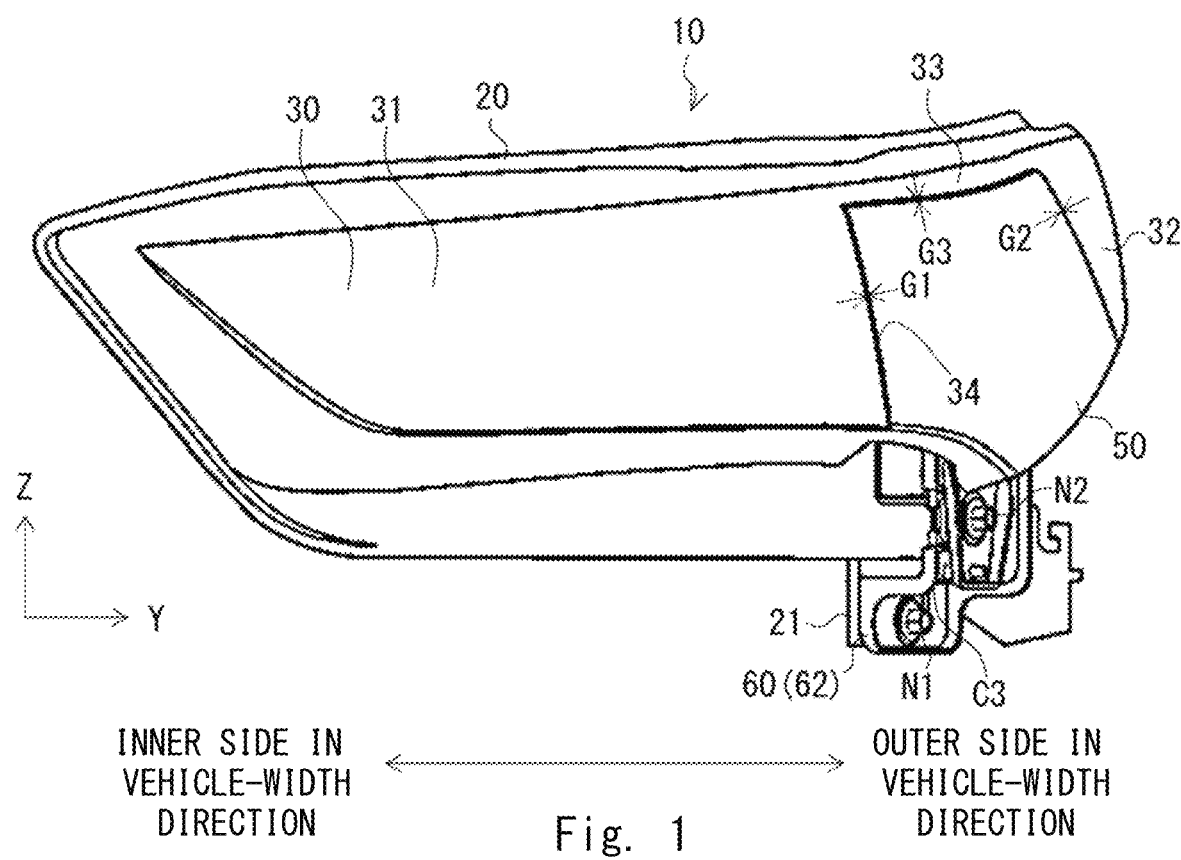
FIG. 1 is a front view of a vehicular lamp fitting 10.

A vehicular lamp fitting 10, which is an embodiment according to the present disclosure, will be described hereinafter with reference to the attached drawings. The same reference numerals (or symbols) are attached to corresponding components throughout the drawings, and redundant explanations thereof are omitted as appropriate.

Figure 2:
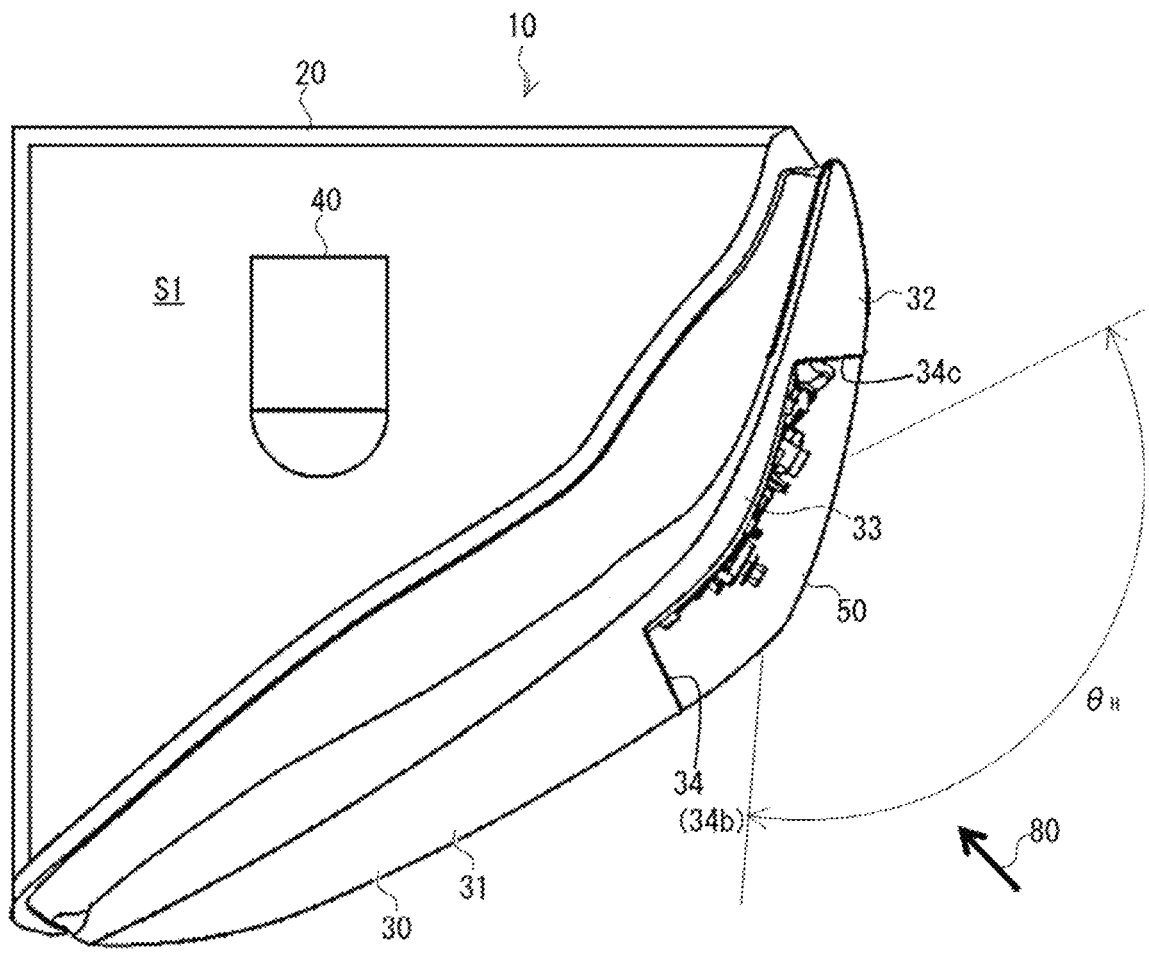
FIG. 2 is a top view of a vehicular lamp fitting 10.

FIG. 1 is a front view of the vehicular lamp fitting 10. FIG. 2 is a top view of the vehicular lamp fitting 10.

The vehicular lamp fitting 10 according to this embodiment is a vehicular lamp fitting that functions as a headlamp, and is mounted on each of the left and right sides of the front end of a vehicle such as an automobile (not shown). Since the vehicular lamp fittings 10 mounted on both the left and right sides of the front end of the vehicle are symmetrical to each other, only the vehicular lamp fitting 10 mounted on the left side (the left side when facing the front side of the vehicle) of the front end of the vehicle will be described hereinafter as a representative example.

Figure 3:
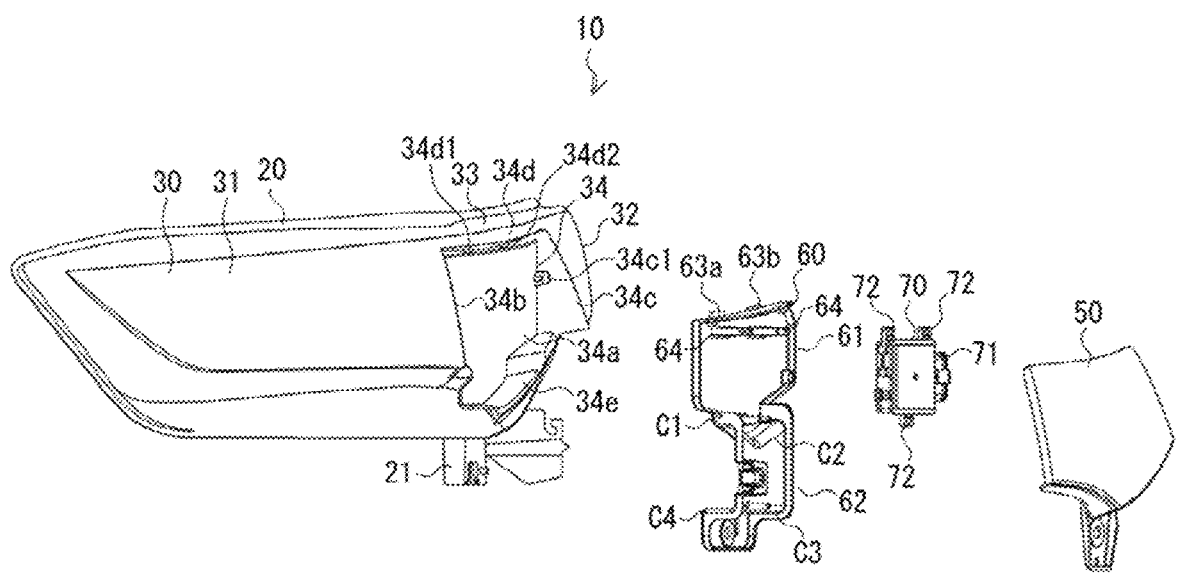
FIG. 3 is an exploded perspective view of the vehicular lamp fitting 10.
Figure 4:
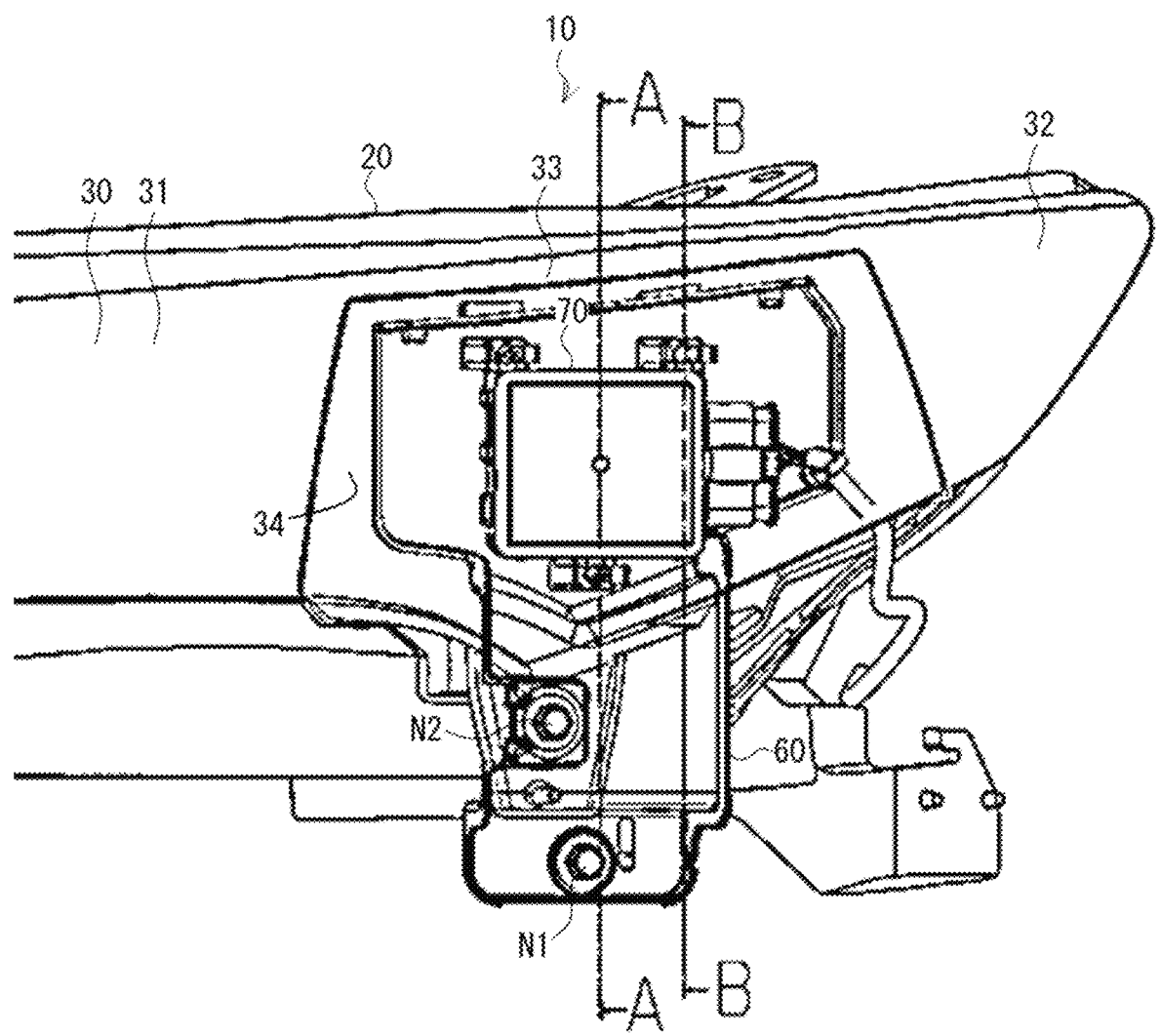
FIG. 4 is a view as seen in a direction indicated by an arrow 80 in FIG. 2.
Figure 5:
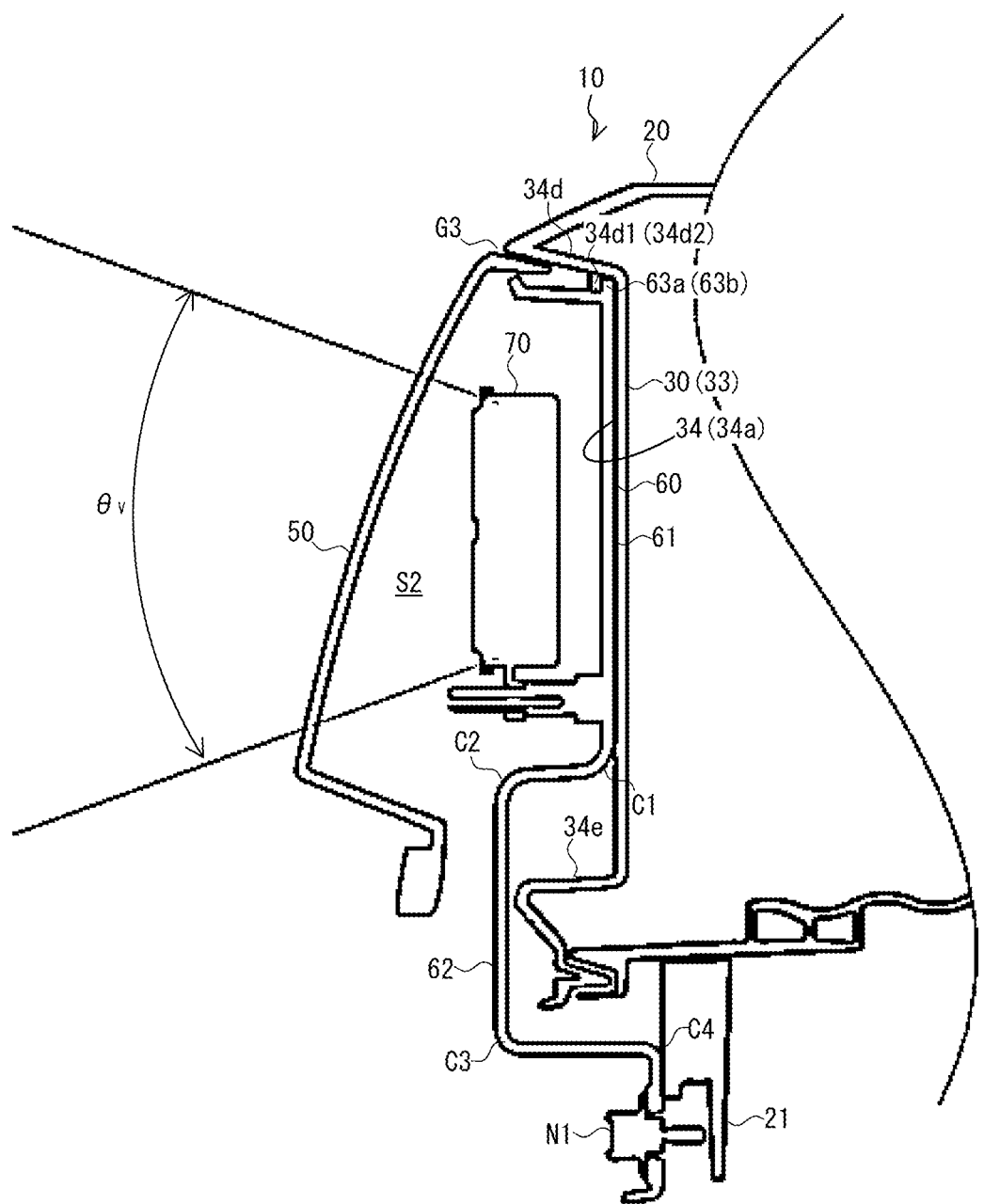
FIG. 5 is a cross-sectional view taken along a line A-A in FIG. 4.
Figure 6:
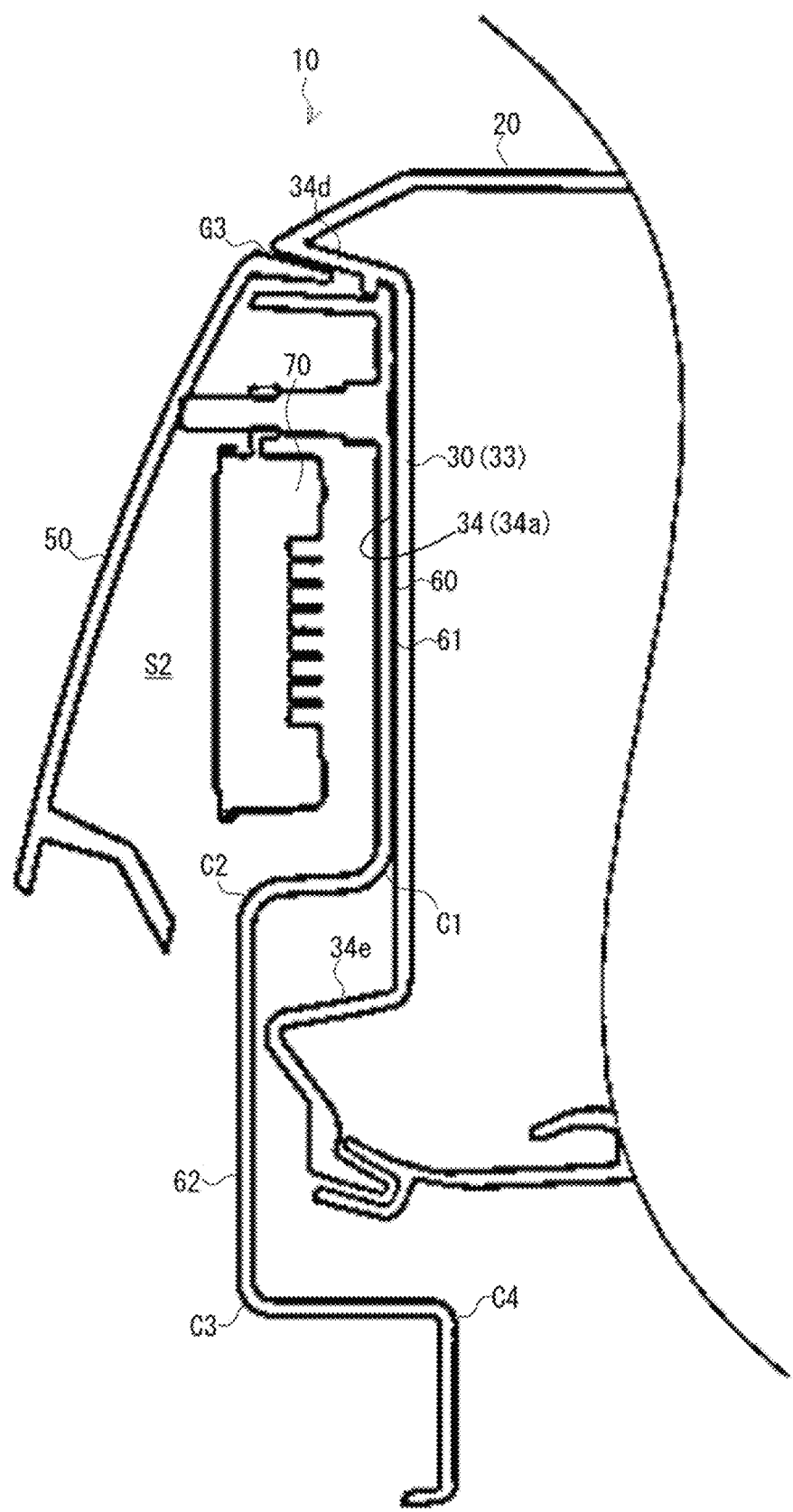
FIG. 6 is a cross-sectional view taken along a line B-B in FIG. 4.
Figure 7:
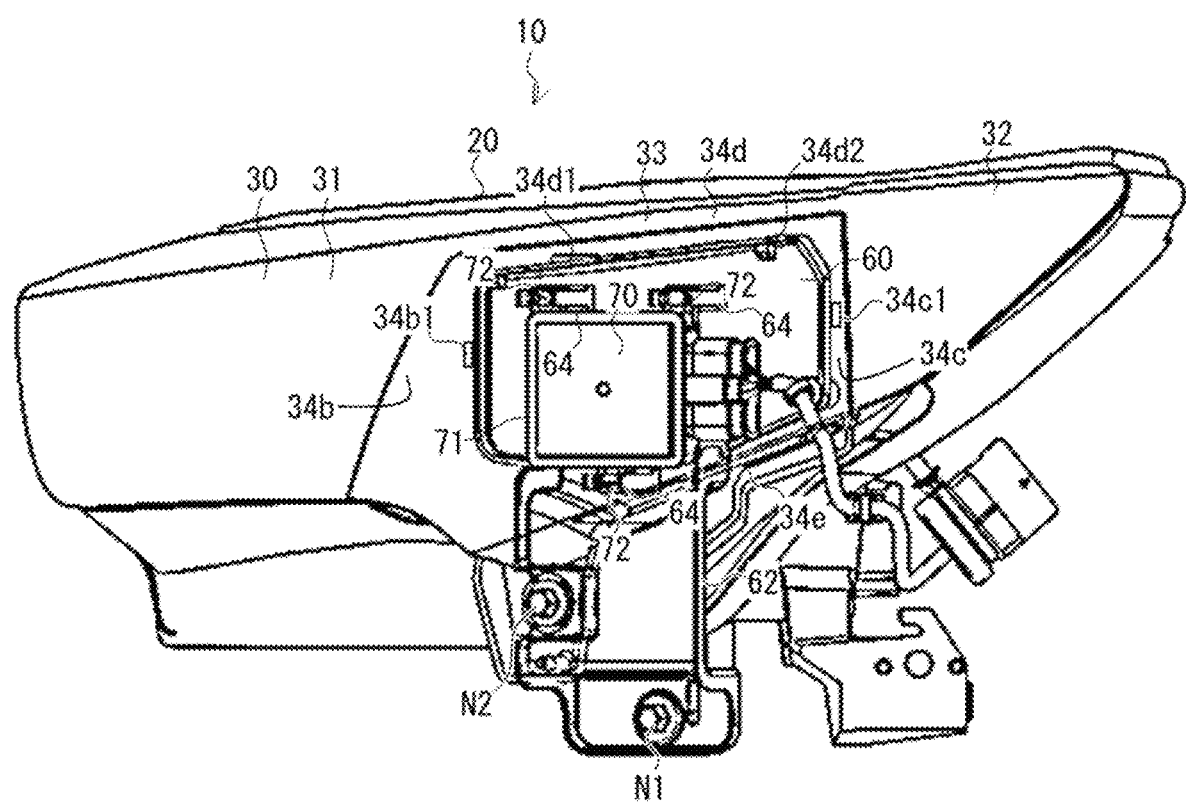
FIG. 7 is a side view of the vehicular lamp fitting 10 (in which illustration of a radar cover 50 is omitted)
Figure 8:
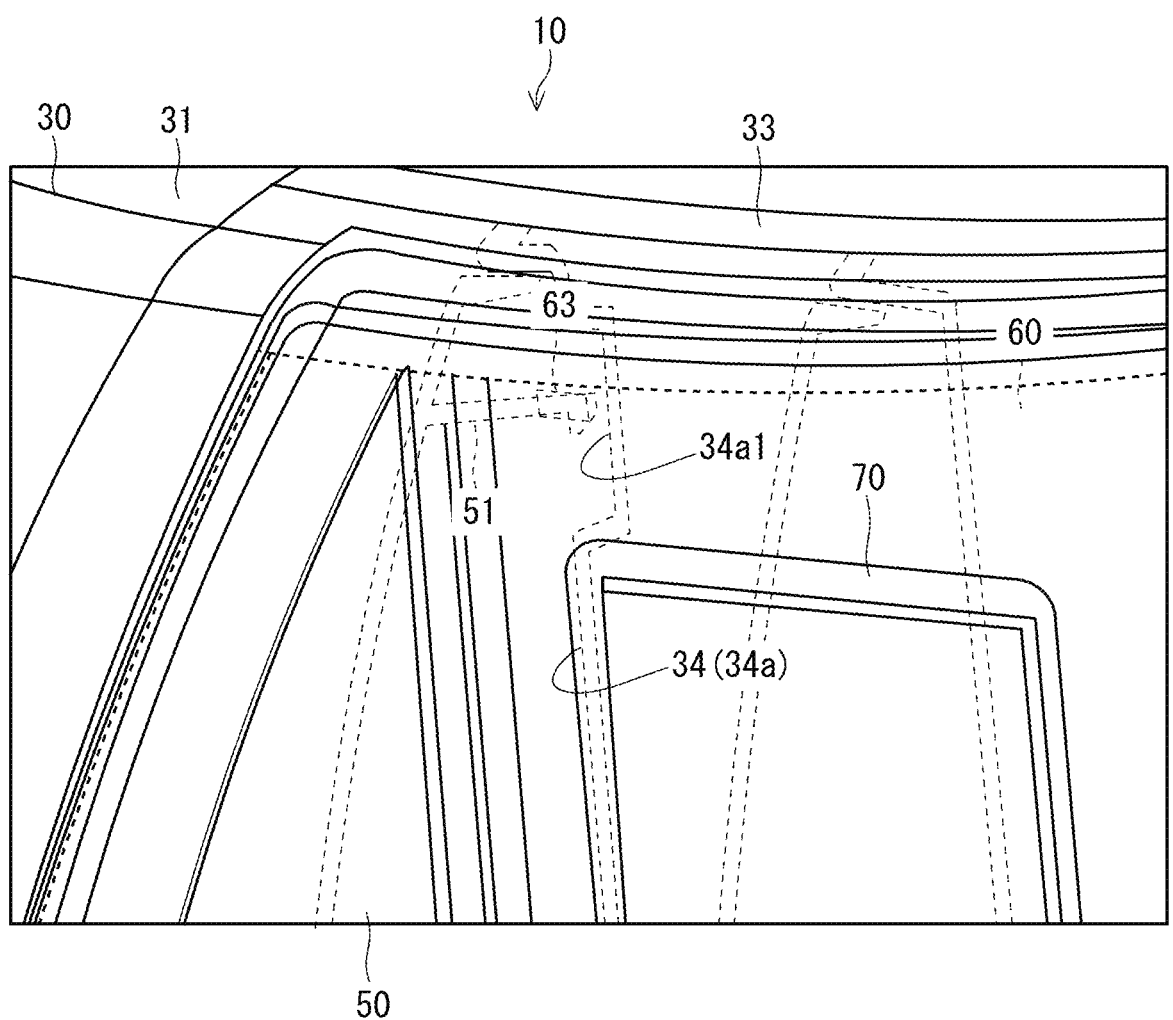
FIG. 8 is an enlarged perspective view of a part of the vehicular lamp fitting 10.

FIG. 3 is an exploded perspective view of the vehicular lamp fitting 10. FIG. 4 is a perspective view as seen in a direction indicated by an arrow 80 in FIG. 2. FIG. 5 is a cross-sectional view taken along a line A-A in FIG. 4. FIG. 6 is a cross-sectional view taken along a line B-B in FIG. 4. FIG. 7 is a side view of the vehicular lamp fitting 10 (in which illustration of a radar cover 50 is omitted). FIG. 8 is an enlarged view of a part of the vehicular lamp fitting 10 (a see-through view).

As shown in FIGS. 2 and 3, etc., the vehicular lamp fitting 10 includes a lamp housing 20, an outer lens 30, lamp unit 40, a radar cover 50, a bracket 60, and a radar unit 70.

The lamp housing 20 is made of a synthetic resin such as acrylic and polycarbonate, and includes an extension part 21 extending downward from the lower end of the outer lens 30 (see FIGS. 3 and 5).

The outer lens 30 is made of a material that is transparent to light (visible light) emitted by the lamp unit 40, and, for example, made of a transparent resin (a synthetic resin) such as acrylic and polycarbonate. The outer lens 30 is attached to the lamp housing 20 in a state in which it covers the opening of the lamp housing 20, and forms a space S1 (an example of the first space in the present disclosure) between the outer lens 30 and the lamp housing 20 (see FIG. 2). The outer lens 30 is welded to the lamp housing 20 (the opening end) along its whole peripheral edge.

As shown in FIGS. 2 and 3, the outer lens 30 includes a front lens part 31 disposed on the front-end side of the vehicle, a side lens part 32 disposed on the lateral side of the vehicle, and a curved lens part 33 disposed between the front lens part 31 and the side lens part 32. Note that the outer lens 30 may have an arbitrary shape as desired according to the design of the vehicle or the like.

The outer lens 30 includes a recessed part 34. The recessed part 34 is disposed on the front side of the curved lens part 33. The recessed part 34 is a recessed part into which the bracket 60 (and the radar cover 50 and the radar unit 70 attached to the bracket 60) is inserted. The recessed part 34 is surrounded by a bottom surface 34a disposed on the rear side, side surfaces 34b and 34c disposed on both the left and right sides, respectively, of the bottom surface 34a, an upper surface 34d disposed above the bottom surface 34a, and a lower surface 34e disposed below the bottom surface 34a (see FIGS. 3 and 7, etc.). Since the bottom surface 34a of the recessed part 34 is surrounded by the side surfaces 34b and 34c disposed on both the left and right sides, and the upper and lower surfaces 34d and 34e, it is possible to provide a good appearance having a sense of integrity as compared to the case where the lower surface 34e is not provided.

In the one side surface 34b of the recessed part 34, a positioning rib 34b1 that abuts against one side of the bracket 60 (the radar-unit holding part 61) is provided (see FIG. 7). Similarly, in the other side surface 34c of the recessed part 34, a positioning rib 34c1 that abuts against the other side of the bracket 60 (the radar-unit holding part 61) is provided (see FIGS. 3 and 7). Further, although it is not shown, a positioning rib that abuts against the upper end of the bracket 60 (the radar-unit holding part 61) is provided in the upper surface 34d of the recessed part 34.

Further, flange parts 34d1 and 34d2 are provided in the upper surface 34d of the recessed part 34 (see FIGS. 3 and 7, etc.). The flange parts 34d1 and 34d2 are disposed in such a manner that a space into which the flange parts 63a and 63b provided in the upper end of the bracket 60 (the radar-unit holding part 61) is inserted is formed between the flange parts 34d1 and 34d2 and the bottom surface 34a of the recessed part 34 (see FIG. 5).

The lamp unit 40 is disposed in the space S1 formed by the outer lens 30 and the lamp housing 20 (see FIG. 2).

The lamp unit 40 is a lamp unit for a headlamp. The lamp unit 40 may be any of a projector-type lamp unit, a reflector-type lamp unit, a direct-projection-type (direct-emission-type) lamp unit, and a lamp unit using a light guiding member (a light guiding rod or a light guiding plate), or may be any other lamp unit. When the headlamp light source for the headlamp (not shown) is turned on, light emitted from the light source for the headlamp passes through the front lens part 31 of the outer lens 30, and is emitted to the outside. In this way, the headlamp is implemented.

The bracket 60 is made of a synthetic resin such as acrylic and polycarbonate, and includes a radar-unit holding part 61 that holds the radar unit 70, and an extension part 62 extending downward from the radar-unit holding part 61 (see FIGS. 3 and 5, etc.).

In the radar-unit holding part 61, engagement parts 64 (disposed at three places in FIG. 3), which engages with flange parts 72 (three places in FIG. 3) provided in the radar unit 70 (the case 71), are provided. Each of the engagement parts 64 is, for example, a pair of claw parts (hook parts) that sandwiches a respective one of the flange parts 72 provided in the radar unit 70 (the case 71) from both the left and right sides, and the engagement parts 64 are disposed at places (three places in FIG. 3) corresponding to those of the flange parts 72 (three places in FIG. 3).

As shown in FIG. 5, the extension part 62 extends forward from the lower end of the radar-unit holding part 61 through a first bending part C1, extends downward through a second bending part C2, extends backward through a third bending part C3, and extends downward through a fourth bending part C4.

As described above, the extension part 62 is formed so as to extend across the recessed part 34 provided in the outer lens 30 (i.e., the lower surface 34e disposed below the bottom surface 34a). Note that the lower surface 34e may not be provided, and the bottom surface 34a of the recessed part 34 provided in the outer lens 30 may have a flat shape extending in the vertically downward direction (the downward direction in FIG. 5). In this case, the extension part 62 of the bracket 60 may not be provided, and the extension part 62 may have a flat shape extending in the vertically downward direction.

The bracket 60 is detachably fixed to the outer lens 30 (the recessed part 34) and the lamp housing 20 (the extension part 21). Specifically, as shown in FIGS. 5 and 7, the flange parts 63a and 63b provided at the upper end of the bracket 60 (the radar-unit holding part 61) are inserted into the spaces between the flange parts 34d1 and 34d2 provided in the upper surface 34d of the recessed part 34 of the outer lens 30 and the bottom surface 34a, so that the upper end of the bracket 60 (an example of the one end of the bracket in the present disclosure) is fixed to the outer lens 30 (the recessed part 34) in a state in which the upper end of the bracket 60 is sandwiched (i.e., interposed) between the flange parts 34d1 and 34d2 and the bottom surface 34a. The flange parts 34d1 and 34d2 are an example of the first fixing part in the present disclosure.

Meanwhile, the lower end of the bracket 60 (the extension part 62) is fixed to the extension part 21 of the lamp housing 20 by screws N1 (see FIGS. 1 and 5), so that the lower end of the bracket 60 (an example of the other end of the bracket in the present disclosure) is fixed to the lamp housing 20 (the extension part 21). Since the extension part 62 of the bracket 60 extends backward from the third bending part C3 toward the extension part 21 of the lamp housing 20, when the lower end of the bracket 60 is fixed by the screws N1, the tightening force from the front to the rear is applied more easily. As a result, it is possible to firmly fix the bracket 60 to the lamp housing 20. The screws N1 are an example of the second fixing part in the present disclosure.

As described above, in the state in which the bracket 60 is detachably fixed to the outer lens 30 (the recessed part 34) and the lamp housing 20 (the extension part 21), the bracket 60 (the rear surface of the radar-unit holding part 61) and the bottom surface 34a of the recessed part 34 of the outer lens 30 are opposed to each other (see FIG. 5). Further, as both the left and right sides of the bracket 60 (the radar-unit holding part 61) abut against the positioning ribs 34b1 and 34c1, respectively, provided in the side surfaces 34b and 34c of the recessed part 34 of the outer lens 30 (see FIG. 7), the bracket 60 is positioned relative to the outer lens 30 (the recessed part 34) in the left/right direction. Further, as the upper end of the bracket 60 (the radar-unit holding part 61) abuts against the positioning rib (not shown) provided in the upper surface 34d of the recessed part 34 of the outer lens 30, the bracket 60 is positioned relative to the outer lens 30 (the recessed part 34) in the up/down direction. Note that the positioning ribs 34b1 and 34c1, and the like may be provided in the bracket 60.

The radar cover 50 is made of a material opaque to visible light, such as a black synthetic resin. The radar cover 50 is provided to protect the radar unit 70 from stepping stones or the like and to improve the appearance. The radar cover 50 is disposed while cover the recessed part 34 of the outer lens 30, and forms a space S2 (an example of the second space in the present disclosure) between the radar cover 50 and the outer lens 30 (the recessed part 34) (see FIG. 5).

The radar cover 50 is detachably fixed to the bracket 60. Specifically, a pair of left and right hook parts 51 (only one of the hook parts 51 is shown in FIG. 8) provided at the upper end of the radar cover 50 are inserted into a pair of left and right through holes 63 (only one of the through holes 63 is shown in FIG. 7) formed at the upper end of the bracket 60, and are engaged with the peripheries of the through holes 63 (see FIG. 8), so that the upper end of the radar cover 50 is fixed to the bracket 60. Note that in order to prevent the hook parts 51, which are inserted into the through holes 63 and protrude to the rear side, from interfering with (e.g., colliding against) the bottom surface 34a of the recessed part 34, recessed parts 34a1 are provided in parts of the bottom surface 34a of the recessed part 34 corresponding to the hook parts 51 protruding from the through holes 63 to the rear side (see FIG. 8).

Meanwhile, the lower end of the radar cover 50 is fixed to the bracket 60 by screws N2 (see FIG. 1), so that the lower end of the radar cover 50 is fixed to the bracket 60.

Note that it is sufficient if the radar cover 50 is large enough to cover the area through which electromagnetic waves transmitted from the radar unit 70 (millimeter waves having the angle of divergence $\theta_V$ in the vertical direction (hereinafter also referred to as the vertical divergence angle $\theta_V$) (see FIG. 5) and the angle of divergence $\theta_H$ in the horizontal direction (hereinafter also referred to as the horizontal divergence angle $\theta_H$) (see FIG. 2)) pass through, and may have an arbitrary shape as desired according to the design of the vehicle or the like as long as it satisfies the aforementioned condition.

The radar unit 70 (the radar apparatus) includes the case 71, a transmitting antenna and a receiving antenna (both of which are not shown) housed in the case 71, and so on. The radar unit 70 is a millimeter-wave radar unit that transmits electromagnetic waves (millimeter waves) from the transmitting antenna. The electromagnetic waves (the millimeter waves) pass through the radar cover 50 and are transmitted to a range having a vertical divergence angle $\theta_V$ (see FIG. 5) and a horizontal divergence angle $\theta_H$ (see FIG. 2). Further, the radar unit 70 receives, by the receiving antenna, reflected waves which have been reflected by an object present in the aforementioned transmission range and have passed through the radar cover 50. The received signal is processed by a control apparatus such as an ECU (Electronic Control Unit) (not shown), so that the object (e.g., a distance, an angle, and a velocity of the object) is detected. In the radar unit 70, for example, millimeter waves in a frequency band of 76 to 81 GHz, in particular, in a frequency band of 79 GHz, are used. However, the frequency band is not limited to these frequency bands.

Note that the radar method of the radar unit 70 may be either of a pulse method or a CW (Continuous Wave) method, or may be any other method. Further, the antenna method of the radar unit 70 may be any of a mechanical scanning method, a beam switching method, a phased array method, and a digital forming method, or may be any other method.

The radar unit 70 is detachably fixed to the bracket 60. Specifically, as shown in FIG. 7, the radar unit 70 is detachably fixed to the bracket 60 as the engagement parts 64 (three places in FIG. 7) provided in the bracket 60 engage with the flange parts 72 (three places in FIG. 7) provided in the case 71. Note that the radar unit 70 may be detachably fixed to the bracket 60 by using, instead of using the engagement parts 64, known fixing means such as screws.

Although it is not shown in the drawings, the vehicular lamp fitting 10 having the above-described configuration is mounted on a vehicle by fixing a flange part(s) provided in the lamp housing 20 to the vehicle (e.g., the frame of the vehicle body or the bumper) by screws.

Next, a procedure for detachably fixing the bracket 60, to which the radar unit 70 and the radar cover 50 are detachably fixed as described above, to the outer lens 30 (the recessed part 34) will be described.

Firstly, the flange parts 63a and 63b provided at the upper end of the bracket 60 (the radar-unit holding part 61) are inserted into the spaces between the flange parts 34d1 and 34d2 provided in the upper surface 34d of the recessed part 34 of the outer lens 30 and the bottom surface 34a thereof (see FIG. 5). As a result, the upper end of the bracket 60 (an example of the one end of the bracket in the present disclosure) is fixed to the outer lens 30 (the recessed part 34) in the state in which the upper end of the bracket 60 is sandwiched (i.e., interposed) between the flange parts 34d1 and 34d2 and the bottom surface 34a.

Next, the lower end of the bracket 60 (the extension part 62) is fixed to the extension part 21 of the lamp housing 20 by using screws N1 (see FIGS. 1 and 5). As a result, the lower end of the bracket 60 (an example of the other end of the bracket in the present disclosure) is fixed to the lamp housing 20 (the extension part 21).

When doing so, both the left and right sides of the bracket 60 (the radar-unit holding part 61) abuts against the positioning ribs 34b1 and 34c1 provided in the side surfaces 34b and 34c of the recessed part 34 of the outer lens 30 (see FIG. 7). As a result, the bracket 60 is positioned relative to the outer lens 30 (the recessed part 34) in the left/right direction. Further, the upper end of the bracket 60 (the radar-unit holding part 61) abuts against the positioning ribs (not shown) provided in the upper surface 34d of the recessed part 34 of the outer lens 30. As a result, the bracket 60 is positioned relative to the outer lens 30 (the recessed part 34) in the up/down direction.

As described above, the bracket 60 is positioned relative to the outer lens 30 (the recessed part 34) in the up/down and left/right directions, so that the gap between the radar cover 50 and the recessed part 34 (see symbols G1 to G3 in FIG. 1) is kept uniform. In this way, the appearance is improved.

Since the upper end of the bracket 60 is fixed to the outer lens 30 (the recessed part 34) and the lower end of the bracket 60 is fixed to the lamp housing 20 (the extension part 21) as described above, the bracket 60 is prevented from widely vibrating even when the vehicle on which the vehicular lamp fitting 10 is mounted vibrates during the traveling. As a result, it is possible to prevent the FOV (Field of View, i.e., the detection width) of the radar unit 70 from widely shaking, and thereby to prevent an error, such as losing sight of the target, from occurring.

Next, a procedure for replacing the radar unit 70 will be described.

Firstly, the screws N2 (see FIGS. 1 and 7) are removed (i.e., unscrewed) and the radar cover 50 is removed from the bracket 60. As a result, the radar unit 70 is exposed. Next, the radar unit 70 is removed from the bracket 60 and replaced by another radar unit 70. When doing so, since the radar unit 70 is detachably fixed to the bracket 60 by the engagement parts 64, the radar unit 70 can be easily replaced by another radar unit 70.

Next, a procedure for attaching the radar cover 50 to the bracket 60 after the radar unit 70 is replaced will be described.

After the radar unit 70 is replaced by another radar unit 70 as described above, firstly, the pair of left and right hook parts 51 (only one of the hook parts 51 is shown in FIG. 8) provided at the upper end of the radar cover 50 are inserted into the pair of left and right through holes 63 (only one of the through holes 63 is shown in FIG. 8) formed at the upper end of the bracket 60, and are engaged with the peripheries of these through holes 63. As a result, the upper end of the radar cover 50 is fixed to the bracket 60. At this time, since the recessed parts 34a1 are provided in the parts of the bottom surface 34a of the recessed part 34 corresponding to the hook parts 51, which protrude from the through holes 63 to the rear side, the hook parts 51, which are inserted into the through holes 63 and protrude to the rear side, do not interfere with (e.g., collide against) the bottom surface 34a of the recessed part 34 (see FIG. 8).

Next, the lower end of the radar cover 50 is fixed to the bracket 60 by screws N2 (see FIGS. 1 and 7). As a result, the lower end of the radar cover 50 is fixed to the bracket 60.

As described above, according to this embodiment, it is possible to prevent (or suppress) vibrations of the radar unit 70 (and as a result, to prevent the detection area of the radar unit 70 from being significantly changed).

This is because the bracket 60 to which the radar unit 70 is fixed does not extend in the cantilevered manner, but one end of the bracket 60 is fixed to the outer lens 30 and the other end thereof is fixed to the lamp housing 20.

Further, according to this embodiment, there is another advantage that the effect of the heat (the heat generated by the lamp unit 40) on the radar unit 70 can be reduced. This is because the radar unit 70 is disposed in the second space S2 (formed by the outer lens 30 and the radar cover 50) in which the temperature is lower than that in the first space S1 (formed by the lamp housing 20 and the outer lens 30) where the temperature is raised due to the heat generated by the lamp unit 40.

Further, according to this embodiment, there is an advantage that maintenance can be easily performed when the radar unit fails. This is because each of the radar unit 70 and the radar cover 50 is detachably fixed to the bracket 60, so that the radar unit 70 can be replaced by removing the radar cover 50 from the bracket 60 without removing the vehicular lamp fitting 10 itself from the vehicle (not shown).

Further, according to this embodiment, it is possible to prevent the distance between the radar unit 70 and the radar cover 50 from changing (and as a result, to prevent noises from occurring in electromagnetic waves (radar signals) that pass through the radar cover 50 and are transmitted to an area around the vehicle). In this way, it is possible to prevent the accuracy of the detection of an object present around the vehicle from deteriorating.

This is because the radar unit 70 and the radar cover 50 are fixed to one and the same bracket 60. That is, since the radar unit 70 and the radar cover 50 are fixed to the same bracket 60, the radar unit 70 and the radar cover 50 vibrate similarly by vibration (For example, vibration during driving) of a vehicle (not shown) on which the vehicular lamp 10 is mounted, and as a result, the distance between the radar unit 70 and the radar cover 50 does not change.

Next, a modified example will be described.

Figure 9:
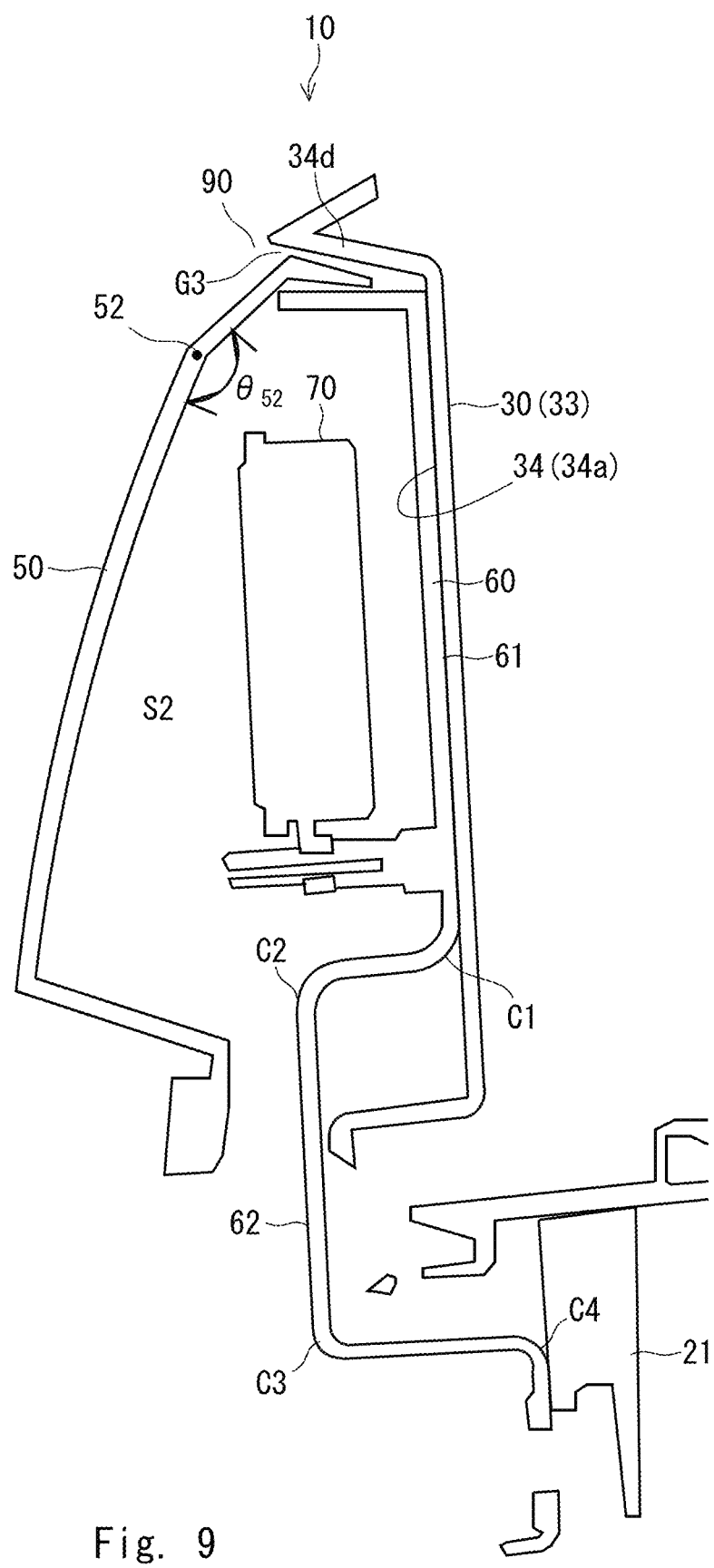
FIG. 9 shows a modified example of the radar cover 50.
Figure 10:
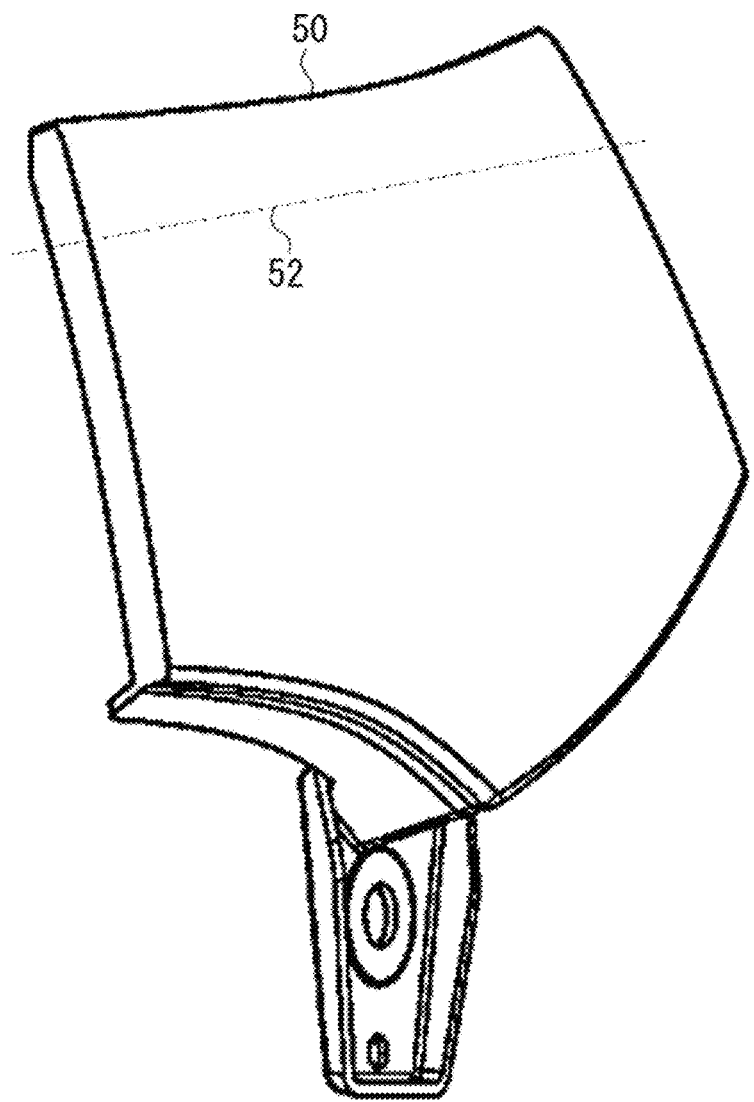
FIG. 10 shows another modified example of the radar cover 50.

FIGS. 9 and 10 show a modified example of the radar cover 50.

As shown in FIG. 9, a stepped part 90 may be formed between the outer lens 30 and the radar cover 50 by positioning the end of the radar cover 50 adjacent to the outer lens 30 (the upper end in FIG. 9) behind the outer lens 30. This stepped part 90 can be formed, for example, by bending the end (the upper end in FIG. 10) of the radar cover 50 backward along a bending part 52 (indicated by a dashed line in FIG. 10). The angle $\theta_{52}$ (see FIG. 9) of this bending part 52 may be an arbitrary angle.

A gap G3 (see FIG. 5) is formed between the outer lens 30 and the radar cover 50 in the vehicular lamp fitting 10 according to the above-described embodiment. Therefore, when the vehicle on which the vehicular lamp fitting 10 is mounted is traveling in the rain, rainwater may enter the gap G3. To cope with this, a stepped part 90 is provided as in the case of this modified example, so that the direction of the wind that the vehicle on which the vehicular lamp fitting 10 is mounted receives during the traveling can be changed, and hence the direction of the rainwater can be changed. Therefore, it is possible to prevent the rainwater from entering the gap G3. Further, by forming an inclined surface in the stepped part 90, the direction of the wind can be controlled. Therefore, it is possible to change the direction of rainwater in a proactive manner, and thereby to facilitate the effect of preventing rainwater from entering the gap G3 even further.

Figure 11:
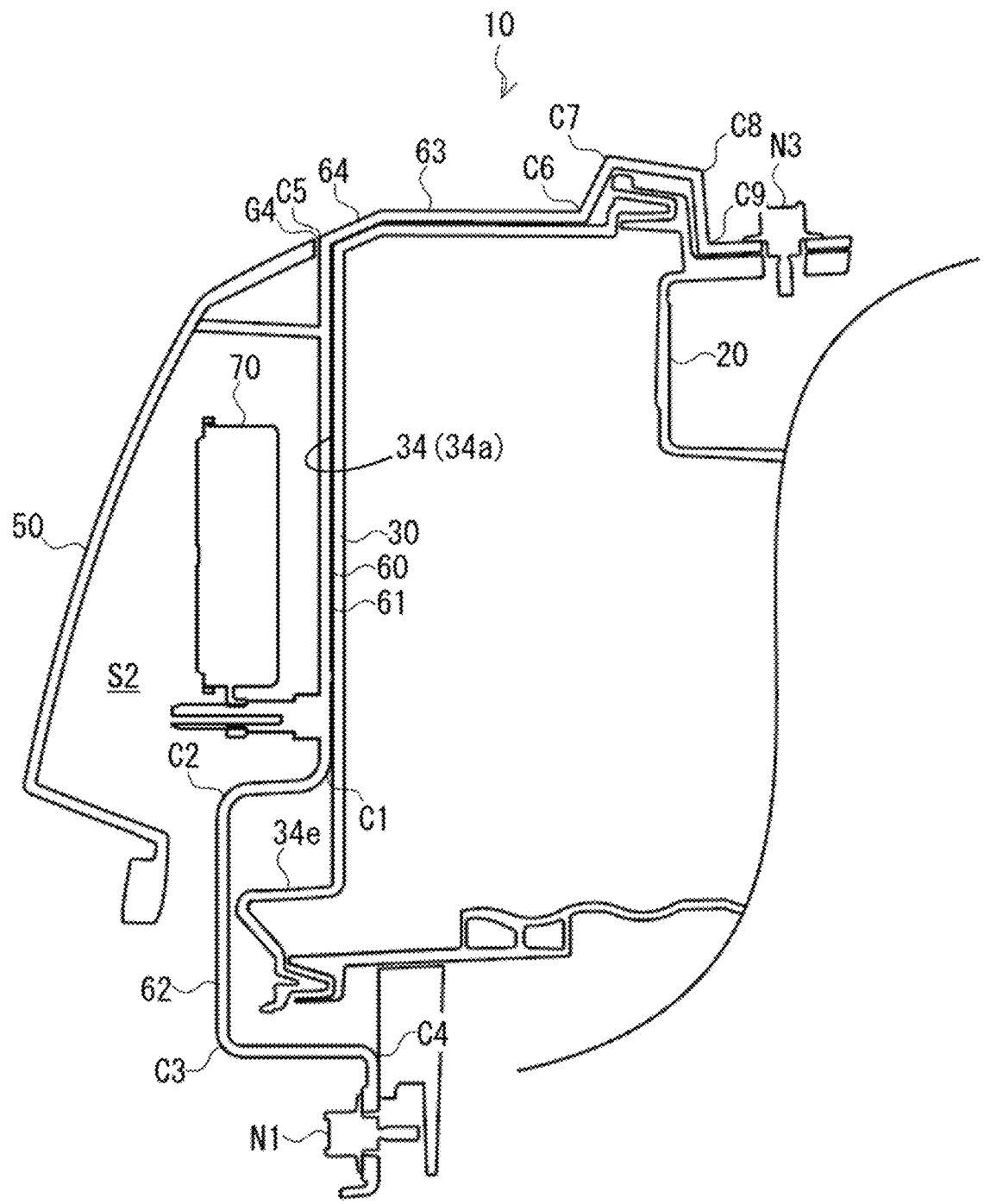
FIG. 11 shows an example (a modified example) in which one end of a bracket 60A is fixed to a lamp housing 20 by a screw N3 and the other end (the lower end) of the bracket 60A is fixed to the lamp housing 20 by a screw N1.

Although an example in which one end (the upper end) of the bracket 60 is fixed to the outer lens 30 (the recessed part 34) and the other end (the lower end) of the bracket 60 is fixed to the lamp housing 20 has been described in the above-described embodiment, the present disclosure is not limited to this example. For example, as shown in FIG. 11, both of one end and the other end (the lower end) of a bracket 60A may be fixed to the lamp housing 20. In this way, the bracket 60A can be fixed to the lamp housing 20 more firmly. FIG. 11 shows an example (a modified example) in which one end of the bracket 60A is fixed to the lamp housing 20 by a screw N3 and the other end (the lower end) of the bracket 60A is fixed to the lamp housing 20 by a screw N1.

The bracket 60A is made of a synthetic resin such as acrylic or polycarbonate, and includes a radar-unit holding part 61 that holds the radar unit 70, an extension part 62 extending downward from the lower end of the radar-unit holding part 61, and an extension part 63 extending backward from the upper end of the radar-unit holding part 61 (see FIG. 11).

As shown in FIG. 11, the extension part 63 extends backward from the upper end of the radar-unit holding part 61 through a fifth bending part C5 and an inclined part 64, and further extends backward through sixth to ninth bending parts C6 to C9 so as to extend across the junction between the lamp housing 20 and the outer lens 30. As described above, the extension part 63 extends rearward from the upper end of the radar-unit holding part 61 so as to extend across the junction of the lamp housing 20 and the outer lens 30.

Further, in the modified example shown in FIG. 11, the inclined part 64 of the bracket 60A and the radar cover 50 are arranged so that they are flush (or roughly flush) with each other across a small gap G4 (i.e., with a small gap G4 interposed therebetween). In this way, the appearance is improved.

Further, in the modified example shown in FIG. 11, since the upper surface 34d of the recessed part 34 is omitted, the radar-unit holding part 61 of the bracket 60A can have a simple shape extending in the up/down direction in FIG. 11.

Further, although an example in which a vehicular lamp fitting according to the present disclosure is applied to a headlamp has been described in the above-described embodiment, the present disclosure is not limited to this example. For example, the present disclosure may be applied to a vehicular lamp fitting other than the headlamp. For example, the present disclosure may be applied to a vehicular lamp fitting such as a rear combination lamp, and may also be applied to other vehicular lamp fittings.

All the numeral values mentioned in the above-described embodiments are merely examples, and numeral values different from them can be uses as appropriate.

The above-described embodiments are merely examples in all the aspects thereof. The present disclosure should not be limited by the descriptions of the above-described embodiments. The present disclosure may be carried out in various other forms without departing from the spirit or main features of the disclosure. From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A vehicular lamp fitting comprising:
a lamp housing;
an outer lens attached to the lamp housing, the outer lens comprising a recessed part and forming a first space between the outer lens and the lamp housing;
a lamp unit disposed in the first space;
a radar cover disposed in a state of covering the recessed part and forming a second space between the radar cover and the recessed part;
a bracket disposed in the second space; and
a radar unit disposed in the second space in a state where the radar unit is detachably fixed to the bracket, wherein
the recessed part has a bottom surface and an upper surface disposed above the bottom surface,
the upper surface is provided with a flange part extending downward from the upper surface,
the upper end of the bracket is inserted and fixed between the bottom surface and the flange part, and
the lower end of the bracket is fixed to the lamp housing by a screw.

2. The vehicular lamp fitting according to claim 1, wherein the radar cover is detachably fixed to the bracket.

3. The vehicular lamp fitting according to claim 1, wherein in one of the recessed part or the bracket, at least one positioning rib, which abuts against the other of the recessed part or the bracket, is provided.

4. The vehicular lamp fitting according to claim 3, wherein the positioning rib maintains a gap between the radar cover and the recessed part uniform.

5. The vehicular lamp fitting according to claim 1, wherein the lower end of the bracket extends through at least one bending part so as to stride over the recessed part.

6. The vehicular lamp fitting according to claim 5, wherein the lower end of the bracket eventually extends toward the lamp housing, and a tip of the lower end of the bracket is fixed to the lamp housing by the screw.

7. The vehicular lamp fitting according to claim 1, wherein a stepped part is formed between the outer lens and a part of the radar cover located adjacent to the outer lens.

8. The vehicular lamp fitting according to claim 7, wherein an end of the radar cover adjacent to the outer lens bends backward through a bending part and thereby be disposed behind the outer lens.

9. The vehicular lamp fitting according to claim 1, wherein the outer lens is transparent to visible light, and the radar cover is opaque to visible light.

\* \* \* \* \*